United States Patent [19]

Tomlinson

[11] 3,852,329

[45] Dec. 3, 1974

[54] PROCESS FOR ISOMERIZATION OF 2-METHYL-3-BUTENE-NITRILE TO A LINEAR PENTENENITRILE

[75] Inventor: Peter E. Tomlinson, Newark, Del.

[73] Assignee: E. I. du Pont de Nemours and Company, Wilmington, Del.

[22] Filed: Oct. 2, 1973

[21] Appl. No.: 402,905

[52] U.S. Cl. .............................. 260/465.9
[51] Int. Cl. ............................. C07c 121/30
[58] Field of Search ....................... 260/465.9

[56] References Cited
UNITED STATES PATENTS

| | | | |
|---|---|---|---|
| 3,526,654 | 9/1970 | Hildebrand | 260/465.9 |
| 3,536,748 | 10/1970 | Drinkard, Jr. et al. | 260/465.9 |
| 3,676,481 | 7/1972 | Chia | 260/465.9 |
| 3,686,264 | 8/1972 | Albanese et al. | 260/465.3 |
| 3,697,578 | 10/1972 | Pasquino et al. | 260/465.9 |

*Primary Examiner*—Joseph P. Brust

[57] ABSTRACT

An improved process for the isomerization of 2-methyl-3-butenenitrile to a linear pentenenitrile such as 3-pentenenitrile at a temperature in the range of 10° to 200°C. in the presence of a catalyst consisting essentially of a zerovalent nickel compound of the formula $Ni(PXYZ)_4$ or a $\pi$-allyl nickel compound of the formula

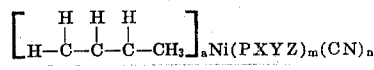

wherein PXYZ is a sigma-pi bonding ligand in which X is OR, Y and Z are R or OR and R is an alkyl or aryl radical or up to 18 carbon atoms, wherein for the $\pi$-allyl nickel compound the R radicals of a given PXYZ ligand are so chosen that the ligand has a cone angle of 130°–170°, $a$ has a value of 1, $m$ has a value of 1–2, and $n$ has a value of 1, which comprises contacting the 2-methyl-3-butenenitrile and the catalyst with an activated crystalline zeolite of the molecular sieve type having substantially uniform pore diameters in the range of about 3A to about 13A.

12 Claims, No Drawings

PROCESS FOR ISOMERIZATION OF 2-METHYL-3-BUTENE-NITRILE TO A LINEAR PENTENENITRILE

BACKGROUND OF THE INVENTION

This invention is concerned with the isomerization of 2-methyl-3-butenenitrile to a linear pentenenitrile and more particularly to 3-pentenenitrile. In the hydrocyanation of butadiene to produce 3-pentenenitrile, an intermediate which on further hydrocyanation yields adiponitrile, a considerable amount of 2-methyl-3-butenenitrile is obtained as a by-product. Processes for isomerizing 2-methyl-3-butenenitrile to linear pentenenitriles such as 3-pentenenitrile are described in U.S. Pat. Nos. 3,536,748 and 3,676,481. In order to realize an overall economic process for production of adiponitrile, a highly efficient process for converting by-product 2-methyl-3-butenenitrile to 3-pentenenitrile has been sought.

SUMMARY OF THE INVENTION

It has now been found that 2-methyl-3-butenenitrile (2M3BN) can be isomerized in high yield to 3-pentenenitrile in the presence of a nickel catalyst complex wherein the 2M3BN and the catalyst are contacted with an activated crystalline metal aluminosilicate zeolite of the molecular sieve type having substantially uniform pore diameters of about 3A to about 13A.

The 2M3BN and the catalyst can be contacted with the crystalline zeolite molecular sieve either prior to their being introduced into the reactor or in the reactor during the course of the isomerization process.

Especially useful zeolite molecular sieves are those corresponding to the formula

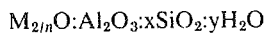

wherein M is an alkali or alkaline earth metal such as lithium, sodium, potassium, rubidium, cesium, calcium, barium or strontium, preferably sodium, potassium or calcium, $n$ denotes the valence of the metal, $x$ has a value of about 2.0 to 2.5 and $y$ has a value up to about 10. Specific molecular sieves that can be used are of the types 3–A, 4–A and 5–A having the general formula

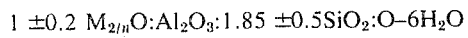

and types 10–X and 13–X having the general formula

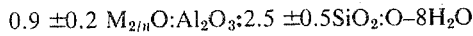

wherein M is preferably sodium, potassium or calcium. Suitable zeolite molecular sieves for use in the process of this invention can be obtained from a number of sources including, in particular, the Linde Division of Union Carbide Corporation and W. R. Grace Co. The preparation of zeolite A molecular sieves is described in U.S. Pat. No. 2,882,243; preparation of zeolite X molecular sieves is described in U.S. Pat. No. 2,882,244.

The crystalline zeolite molecular sieves can be activated for use or regenerated following periods of use by heating at a temperature in the range of 100°C. to about 350°C., optionally under reduced pressure or swept with a gas such as nitrogen or natural gas during which water of hydration is removed.

As indicated above, in the process of this invention, the 2M3BN and the catalyst can be contacted with the molecular sieve, for example, by introducing the zeolite molecular sieve into the reactor along with 2M3BN and the catalyst. Alternatively the 2M3BN and catalyst can be contacted with the molecular sieve prior to their being introduced into the reactor or recycle streams of the 2M3BN and catalyst can be contacted with the molecular sieve by passing them through a fixed bed of the molecular sieve prior to their being returned to the reactor.

The process of this invention, that is, the contacting of the 2M3BN and catalyst with the zeolite molecular sieve as well as the isomerization of 2M3BN to 2-pentenenitrile can be carried out at a temperature in the range of 10°–200°C., preferably 110°–155°C. when a zerovalent nickel complex of the type Ni(PXYZ)$_4$ is used for isomerization of the 2M3BN. When $\pi$-allyl nickel catalyst is used the reaction can be carried out at a temperature in the range of 0° to 120°C. and preferably 80°–100°C.

The nickel complexes that are useful as catalysts in the process of this invention include zerovalent nickel complexes of the general formula Ni(PXYZ)$_4$ as described in U.S. Pat. No. 3,536,748 or $\pi$-allyl nickel compounds of the formula

wherein PXYZ is a sigma-pi bonding ligand in which X is OR, Y and Z are R or OR and R is an alkyl or aryl radical having up to 18 carbon atoms wherein for the $\pi$-allyl nickel compound the R radicals of a given PXYZ ligand are so chosen that the ligand has a cone angle in the range of 130°–170°, $a$ has a value of 1, $m$ has a value of 1–2 and $n$ has a value of 1. Suitable phosphorus ligands for the zerovalent nickel compounds of the type Ni(PXYZ)$_4$ include such phosphorus compounds as triphenyl phosphite, tri-m-tolyl phosphite, tri-p-tolyl phosphite, tri-(m & p-tolyl)phosphite, tri-(m & p-methoxyphenyl)phosphite and mixtures thereof. Suitable ligands of the type PXYZ for the $\pi$-allyl nickel compounds include tri-o-tolyl phosphite, tri-(2,5-xylyl) phosphite, tri-(2,4-xylyl)phosphite, tri-(o-phenylphenyl) phosphite, di-o-tolyl phenyl phosphonite, diphenyl phenyl phosphonite and phenyl diphenyl phosphinite. The cone angle is determined as described by C. A. Tolman, J.Am.Chem. Soc. 92, 2,956 (1970).

It may also be of advantage in carrying out the process of this invention to use an excess of the phosphorus ligand PXYZ over that required in the formula Ni(PXYZ)$_4$ or in the $\pi$-allyl nickel complex. The excess ligand can be present either along with the 2M3BN and catalyst during the contacting with the molecular sieve prior to introduction of the 2M3BN and catalyst to the reactor or it can be introduced into the reactor along with or subsequent to contacting of the 2M3BN and catalyst with the molecular sieve. In general, at least a one-mole excess of the ligand can be used and amounts of 30 moles excess or more may be used, the top limit being dictated mainly by economic consideration.

The 3-pentenenitrile obtainable by the process of this invention is useful as an intermediate for further hydrocyanation to adiponitrile which in turn can be converted to hexamethylenediamine, used in the production of commercial polyamides for fibers, films and molded articles. An important advantage realized by the process of this invention is the improved conversion and yield of desired linear pentenenitrile with reduced loss to undesirable products such as 2-methyl-2-butenenitrile.

DESCRIPTION OF PREFERRED EMBODIMENTS

The preferred embodiments of this invention are illustrated in the examples to follow.

In the several runs of the example described below, a stream comprising mainly 2-methyl-3-butenenitrile (2M3BN) and catalyst of the type $Ni(PXYZ)_4$ was fed continuously into a reactor wherein isomerization of 2M3BN to 3-pentenenitrile (3PN) was effected. The catalyst consisted essentially of the zerovalent nickel complex of a mixed tri-(m and p-tolyl) phosphite, the mole ratio of aryl phosphite to zerovalent nickel being about 15 to 1. The zerovalent nickel complex can be prepared by contacting nickel chloride with finely divided zinc in a mixture of tri-(m and p-tolyl) phosphite and 3PN, with ammonia or an ammonium halide as a promoter. Zinc chloride, which forms as a by-product in the reduction, can be removed from the catalyst system by precipitation with gaseous ammonia. The product stream from the reactor was sampled periodically to determine extent of conversion to 3-pentenenitrile. Results of several series of control and test runs are summarized in tabular form below. All runs were carried out under a pressure of 19–20 psig. Products were analyzed by gas chromatography. Gas chromatography data expressed in area percent are approximations of weight percent. See Purnell, *Gas Chromatography*, John Wiley & Sons (1962), page 285.

The various runs described below were carried out in substantially the same manner except that in the test runs the 2M3BN and catalyst feed streams were passed through a bed of activated Type 4A crystalline zeolite molecular sieves before entering the reactor. The Type 4A molecular sieves were obtained from the Linde Division, Union Carbide Corporation. Regeneration of the molecular sieve bed was carried out by flushing the bed for 1 hour with 2M3BN and thereafter sweeping the bed with natural gas at about 210° to 220°C. for 4 hours.

Example 1

| Run | 2M3BN in Feed (wt. %) | Catalyst Ni(O) (wt. %) | Temperature | Yield 3PN | Conversion* % |
|---|---|---|---|---|---|
| A. Control Runs | | | | | |
| 1 | 87.94 | 0.68 | 160°C. | 54% | 95 |
| 2 | 77.47 | .71 | 132 | 75 | 47 |
| 3 | 83.07 | .80 | 141 | 82 | 55 |
| 4 | 81.86 | .73 | 157 | 79 | 93 |
| 5 | 82.6 | .75 | 159 | 49 | 97 |
| | | | Average Yield | 68% | |
| B. Test Runs | | | | | |
| 6 | 90.12 | .87 | 152 | 89 | 94 |
| 7 | 84.98 | .83 | 152 | 89 | 94 |
| 8 | 83.46 | .80 | 154 | 90 | 90 |
| 9 | 87.72 | .80 | 153 | 85 | 95 |
| | | | Average Yield | 89% | |
| C. Control Runs | | | | | |
| 10 | 85.35 | .87 | 145 | 86 | 88 |
| 11 | 80.83 | .82 | 147 | 80 | 88 |
| 12 | 80.78 | .91 | 144 | 81 | 77 |
| | | | Average Yield | 82% | |
| D. Test Runs | | | | | |
| 13 | 83.75 | .79 | 134 | 85 | 86 |
| 14 | 88.65 | .85 | 137 | 87 | 57 |
| 15 | 87.36 | .86 | 138 | 91 | 64 |

Example 1-Continued

| Run | 2M3BN in Feed (wt. %) | Catalyst Ni(O) (wt. %) | Temperature | Yield 3PN | Conversion* % |
|---|---|---|---|---|---|
| A. Control Runs | | | | | |
| 16 | 87.36 | .87 | 149 | 92 | 88 |
| 17 | 83.04 | .88 | 138 | 91 | 65 |
| | | | Average Yield | 89% | |
| E. Control Runs | | | | | |
| 18 | 77.75 | .92 | 96 | 69 | 85 |
| 19 | 85.42 | .90 | 135 | 50 | 90 |
| 20 | 80.49 | .92 | 146 | 60 | 87 |
| | | | Average Yield | 60% | |
| F. Test Runs | | | | | |
| 21 | 82.45 | .92 | 149 | 90 | 94 |
| 22 | 77.06 | .93 | 137 | 90 | 93 |
| 23 | 77.06 | .88 | 133 | 89 | 86 |
| 24 | 81.33 | .83 | 145 | 90 | 93 |
| 25 | 78.22 | .86 | 148 | 90 | 94 |
| | | | Average Yield | 90% | |

*2M3BN converted to 3PN/2M3BN feed

I claim:

1. A process of isomerizing 2-methyl-3-butenenitrile and thereby producing 3-pentenenitrile which comprises contacting 2-methyl-3-butenenitrile in a reactor at a temperature in the range of 10° to 200°C. with a catalyst consisting essentially of a nickel complex of the group consisting of a zerovalent nickel compound of the formula $Ni(PXYZ)_4$ and a $\pi$-allyl nickel compound of the formula $$\left[ H-\overset{H}{\underset{|}{C}}-\overset{H}{\underset{|}{C}}-\overset{H}{\underset{|}{C}}-CH_3 \right]_a Ni(PXYZ)_m(CN)_n$$

wherein PXYZ is a sigma-pi bonding ligand in which X is OR, Y and Z are R or OR and R is of the group consisting of alkyl and aryl radicals of up to 18 carbon atoms wherein for the $\pi$-allyl nickel compound the R radicals of a given PXYZ ligand are so chosen that the ligand has a cone angle of 130° to 170°; $a$ has a value of 1, $m$ has a value of 1–2 and $n$ has a value of 1, wherein the 2-methyl-3-butenenitrile and the catatlyst are contacted with an activated crystalline metal alumino-silcate zeolite molecular sieve having substantially uniform pore diameters in the range of about 3A to about 13A.

2. The process of claim 1 wherein the crystalline zeolite molecular sieve corresponds to the formula $$M_{2/n}O:Al_2O_3:xSiO_2:yH_2O$$

wherein M is a metal of the group consisting of alkali and alkaline earth metals, $n$ denotes the valence of the metal, $x$ has a value of about 2–2.5 and $y$ has a value up to about 10.

3. The process of claim 2 wherein M is of the group consisting of sodium, potassium and calcium.

4. The process of claim 3 wherein the 2-methyl-3-butenenitrile and the catalyst are contacted with the crystalline zeolite molecular sieve prior to their being introduced into the reactor.

5. The process of claim 4 wherein the catalyst consists essentially of a zerovalent nickel complex of the formula $Ni(PXYZ)_4$ wherein X is OR, Y and Z are R or OR and R is an alkyl or aryl radical having up to 18 carbon atoms, and the reaction is carried out at a temperature in the range of 110° to 155°C.

6. The process of claim 5 wherein at least a one-molar excess of the ligand PXYZ is used over that required for the complex $Ni(PXYZ)_4$.

7. The process of claim 6 wherein PXYZ is tri-(m and p-tolyl)phosphite.

8. The process of claim 7 wherein the crystalline zeolite molecular sieve is of the group consisting of Types 3A, 4A, 5A, 10X and 13X.

9. The process of claim 4 wherein the catalyst consists essentially of a π-allyl nickel complex of the formula

wherein PXYZ is a sigma-pi bonding ligand in which X is OR, Y and Z are R or OR and R is of the group consisting of alkyl and aryl radicals having up to 18 carbon atoms, wherein the R radicals of a given phosphorus ligand are so chosen that the ligand has a cone angle of 130° to 170°, wherein $a$ has a value of 1, $m$ has a value of 1-2 and $n$ has a value of 1, and the reaction is carried out at a temperature in the range of 80° to 100°C.

10. The process of claim 9 wherein at least a one-mole excess of the ligand PXYZ is used over that required for the π-allyl nickel complex.

11. The process of claim 10 wherein PXYZ is tri-o-tolyl phosphite.

12. The process of claim 11 wherein the crystalline zeolite molecular sieve is of the group consisting of Types 3A, 4A, 5A, 10X and 13X.

* * * * *